Patented Aug. 26, 1952

2,608,582

UNITED STATES PATENT OFFICE 2,608,582

PRODUCTION OF p-ACETYLAMINOBENZ-ALDEHYDE

William G. Huey, Nassau, and Bernard W. Rottschaefer, East Greenbush, N. Y., assignors to General Aniline & Film Corporation, New York, N. Y., a corporation of Delaware No Drawing. Application June 9, 1950, Serial No. 167,260

4 Claims. (Cl. 260—562)

The present invention relates to a one-step method of producing p-acetylaminobenzaldehyde from p-nitrotoluene in good yields and in a high degree of purity.

p-Aminobenzaldehyde is a white crystalline water-soluble compound which condenses very readily to a yellow water-insoluble condensation product which appears in properties to be a type of Schiff's Base. Even when p-aminobenzaldehyde is freshly prepared and isolated, it tends to condense. Consequently when such product is acylated, it gives poor yields, the acylated product also being quite impure.

Efforts have been made to reverse the condensation and to acylate the monomeric product. Some p-acetylaminobenzaldehyde has been obtained in this way, but the yields were poor and by-products and tar resulted.

It has been proposed to produce p-acetylaminobenzaldehyde while starting from p-nitrotoluene. During the conversion of the p-nitrotoluene into the corresponding benzaldehyde, some p-toluidine is formed as a by-product. It has been customary in the art to steam-distill off the p-toluidine and to isolate the p-aminobenzaldehyde for subsequent acylation.

We have now discovered that p-acetylaminobenzaldehyde can be obtained in high yields and in pure form by simultaneously oxidizing and reducing p-nitrotoluene to p-aminobenzaldehyde in an aqueous alcohol medium. The alcohol is removed by distillation and the water layer formed is separated. Some p-toluidine which is formed in the reaction as a by-product is allowed to remain and it acts as a solvent for the p-aminobenzaldehyde. This solution is promptly subjected to acylation by means of acetic anhydride.

Such procedure constitutes the purposes and objects of the present invention.

The simultaneous oxidation and reduction of the p-nitrotoluene to p-aminobenzaldehyde is effected in an aqueous alcohol medium by means of an alkaline alkali metal polysulfide solution. Such polysulfide solution is formed by dissolving sulfur in a solution of caustic soda, caustic potash or alkali sulfide solution.

The alkaline polysulfide solution is added to the p-nitrotoluene dissolved in ethyl alcohol. This mixture is then heated to reflux for several hours and the alcohol distilled. On standing, an oily layer collects on the top and this is mainly p-aminobenzaldehyde dissolved in p-toluidine formed as a by-product.

The oily layer is drawn off and subjected to acylation with acetic anhydride at a temperature ranging from about 60 to 100° C.

The reaction mixture is worked up in a sodium bisulfite solution. The acetyl toluidide formed during the acylation is insoluble in sodium bisulfite solution and is precipitated and filtered from the water-soluble p-acetylaminobenzaldehyde-bisulfite addition compound. The latter is treated with caustic to precipitate the p-acetylaminobenzaldehyde.

It has been ascertained that by proceeding in this fashion, condensation of the p-aminobenzaldehyde is inhibited to a far-reaching extent for a number of reasons, to wit: (1) the operation up to the actual point of acylation proceeds in an alkaline medium; (2) there is no steam distillation step after the initial elimination of the alcohol; (3) the immediate use of the p-aminobenzaldehyde does not provide time for substantial condensation to ensue.

By maintaining condensation at a minimum, it is possible to obtain high yields of the desired end product and in a high state of purity.

The invention is further illustrated by the following example in which the parts are by weight. It is to be understood, however, that the invention is not restricted thereto.

Example 55 parts of flowers of sulfur are stirred into a mixture of 90 parts of 30 per cent caustic soda and 250 parts of water and maintained at 80–90° C. until all the sulfur has dissolved. This mix is gradually added (over a period of two hours) to 91 parts of p-nitrotoluene dissolved in 300 parts of ethyl alcohol held at a temperature of 78–80° C. The mixture is refluxed for about two hours and then the alcohol is distilled. On standing an oily layer rises to the surface. This is drawn off and poured into 85 parts of acetic anhydride over a period of about 1 hour at a temperature of 65–70° C. The mixture is heated at 95° C. for about 2 hours, cooled and drowned in 250 parts of cold water.

In order to purify the product, sufficient caustic is added to impart to the charge a pH of about 6.5–6.8, followed by addition of 60 parts of sodium bisulfite powder. The charge is stirred well and filtered at 25° C., the filter cake is resludged and then discarded. The mother liquor is treated in the cold with caustic soda solution to a strong alkaline reaction (Clayton Yellow Paper) and the precipitated p-acetylaminobenzaldehyde separated by filtration. It is washed with cold water and dried. A product having a melting point of 152–3° C. is obtained.

We claim:

1. The process of producing p-acetylaminobenzaldehyde which comprises heating p-nitrotoluene in an aqueous alcoholic medium with alkaline alkali metal polysulfide solution to effect simultaneous oxidation and reduction of the p-nitrotoluene to p-aminobenzaldehyde, distilling the alcohol and promptly acetylating the p-aminobenzaldehyde while dissolved in the p-toluidine produced as a by-product in the oxidation-reduction reaction by heating the same with acetic anhydride at a temperature ranging from 60 to 100° C.

2. The process of producing p-acetylaminobenzaldehyde which comprises adding a solution of alkaline sodium polysulfides gradually to a solution of p-nitrotoluene in ethyl alcohol, refluxing the reaction mixture, distilling the alcohol, collecting the oily layer which forms, said oily layer containing p-aminobenzaldehyde dissolved in p-toluidine formed as a by-product and subjecting such oily layer to the action of acetic anhydride at a temperature ranging from 60 to 100° C.

3. The process as defined in claim 1 wherein the p-acetylaminobenzaldehyde is separated from the acetylated p-toluidine by treatment with aqueous sodium bisulfite and filtration.

4. The process as defined in claim 2 wherein the p-acetylaminobenzaldehyde is separated from the acetylated p-toluidine by treatment with aqueous sodium bisulfite and filtration.

WILLIAM G. HUEY.
BERNARD W. ROTTSCHAEFER.

REFERENCES CITED

The following references are of record in the file of this patent:

FOREIGN PATENTS

| Number | Country | Date |
|---|---|---|
| 86,874 | Germany | May 7, 1896 |

OTHER REFERENCES

Gabriel: "Ber. Deut. Chem.," vol. 16 (1883), pp. 2003–2004.

Blanksma: "Chem. Cent.," (1910) vol. 81–I, pp. 260–261.

Blanksma: "Rec. Trav. Chem. Pays. Bqs.," vol. 28 (1909), pp. 109–110.

Janse: "Rec. Trav. Chem. Pays. Bqs.," vol. 40 (1921), p. 289.

Beard et al.: "J. Chem. Soc." (London), 1944, pp. 4 and 5.